United States Patent [19]
Hannert et al.

[11] Patent Number: 5,997,030
[45] Date of Patent: Dec. 7, 1999

[54] VEHICLE INSTRUMENT PANEL WITH SEAMLESS AIRBAG COVER

[75] Inventors: Lynn F. Hannert, Harrison Township, Macomb County; Timothy O'Brien, White Lake, both of Mich.

[73] Assignee: Lear Automotive Dearborn, Inc., Southfield, Mich.

[21] Appl. No.: 08/816,791

[22] Filed: Mar. 19, 1997

[51] Int. Cl.$^6$ .................................................. B60R 21/20
[52] U.S. Cl. ...................................... 280/728.3; 280/732
[58] Field of Search ........................... 280/728.3, 732, 280/752; 180/90; 296/70

[56] References Cited

U.S. PATENT DOCUMENTS

| | | | |
|---|---|---|---|
| 5,143,401 | 9/1992 | Zushi | 280/728.3 |
| 5,174,602 | 12/1992 | Nakayama et al. | 280/728.3 |
| 5,292,150 | 3/1994 | Watanabe et al. | 280/728.3 |
| 5,456,490 | 10/1995 | Carter et al. | 280/728.3 |
| 5,458,361 | 10/1995 | Gajewski | 280/728.3 |
| 5,460,401 | 10/1995 | Gans et al. | 280/728.3 |
| 5,533,748 | 7/1996 | Wirt et al. | 280/728.3 |
| 5,564,731 | 10/1996 | Gallagher et al. | 280/728.3 |

FOREIGN PATENT DOCUMENTS

| | | | |
|---|---|---|---|
| 41 37 926 | 5/1992 | Germany | 280/728.3 |
| 5-162600 | 6/1993 | Japan | 280/728.3 |
| 5-185894 | 7/1993 | Japan | 280/752 |
| 5-185896 | 7/1993 | Japan | 280/752 |

*Primary Examiner*—Peter C. English
*Attorney, Agent, or Firm*—Brooks & Kushman P.C.

[57] ABSTRACT

An improved instrument panel includes an airbag cover defined by a tear strip on an inner face of the airbag cover. The outer face of the instrument panel does not include any indication of the tear strip, and thus has a seamless appearance. A hinge is preferably provided to secure the airbag cover to the remainder of the instrument panel when the airbag deploys.

7 Claims, 3 Drawing Sheets

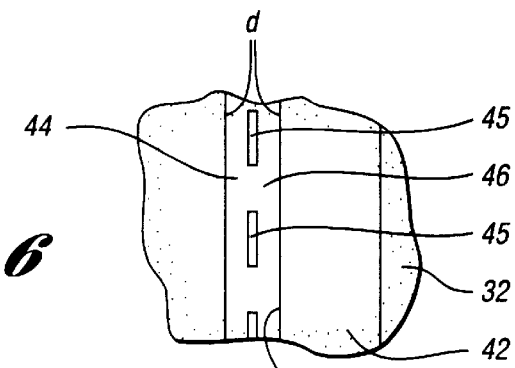
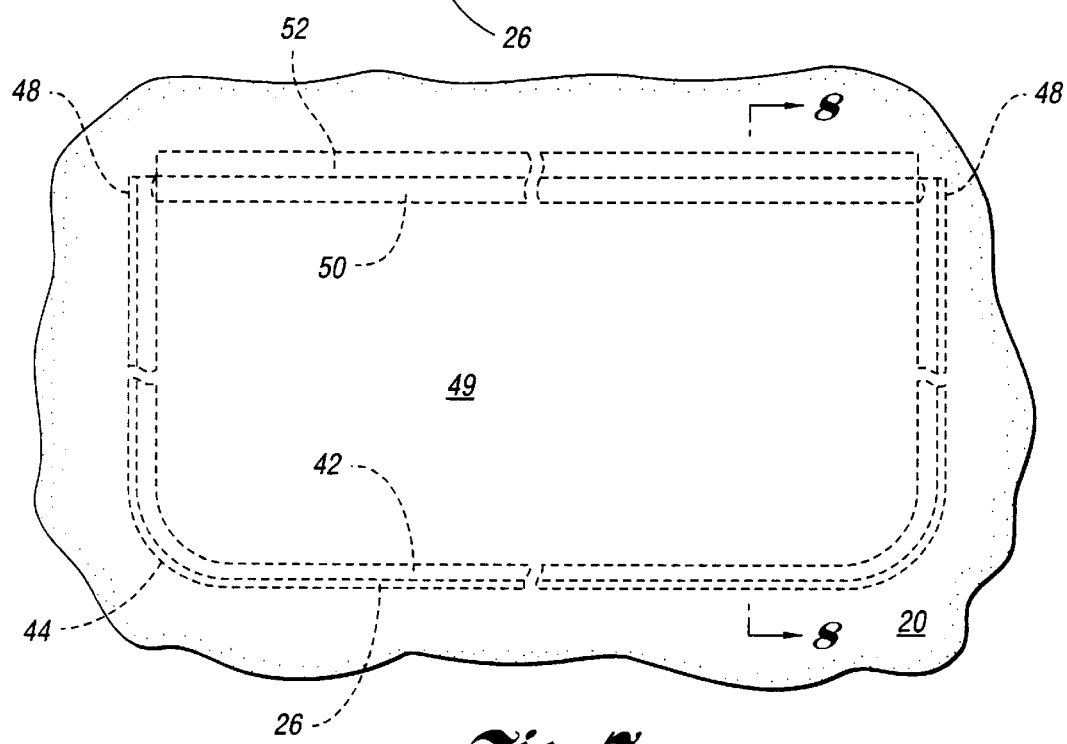
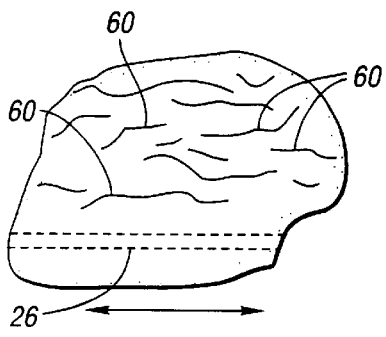
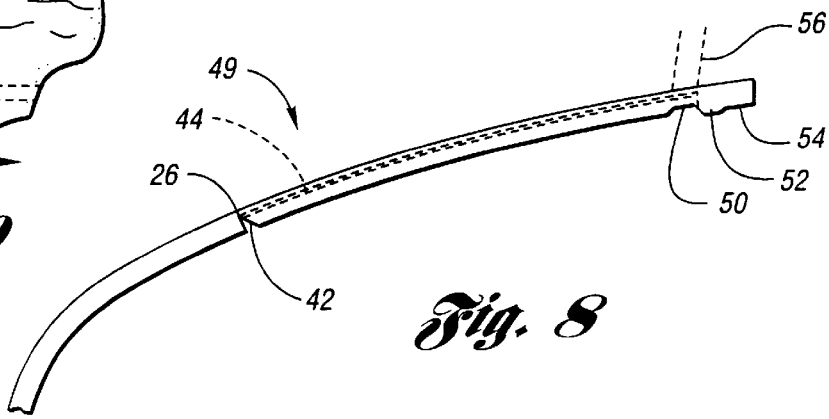

VEHICLE INSTRUMENT PANEL WITH SEAMLESS AIRBAG COVER

BACKGROUND OF THE INVENTION

This invention relates to the provision of a vehicle instrument panel having an outwardly facing surface which includes no seams over an area that tears away upon actuation of an underlying airbag.

Airbags are incorporated into the passenger side of known vehicles. Typically, airbags are provided with a separate cover which is forced away from the remainder of the instrument panel when the airbag deploys. The use of the separate airbag cover has presented some concerns to the designer of the instrument panel. First, there is a gap between the separate cover and the remainder of the panel which is relatively unsightly. Moreover, it has been somewhat difficult to match the texture and color of the cover and the remainder of the instrument panel.

SUMMARY OF THE INVENTION

In a disclosed embodiment of this invention, an instrument panel is formed to have an integral airbag cover defined by a tear strip. Preferably, the instrument panel has a seamless outwardly facing surface. An airbag is mounted behind the instrument panel. An observer of the instrument panel does not see any seams or other lines between the portion of the instrument panel which will break outwardly of the instrument panel and the remainder of the instrument panel. That is, the instrument panel is "seamless" at the airbag cover on an outer surface which faces the vehicle occupant.

In a preferred embodiment of this invention, the airbag cover is defined on an inner face of the instrument panel by molding a tear line into a substrate for the instrument panel. The molded tear line preferably surrounds at least three sides of an airbag cover. The tear line preferably only extends through a portion of the substrate. Thus, the frontwardly facing surface is molded at one time, and there is no difficulty in matching the color and texture between the airbag cover and the remainder of the instrument panel.

The instrument panel is typically formed to have a relatively rigid plastic substrate. The outermost surface may or may not be covered with a foam back vinyl material. As mentioned above, the tear line is preferably molded into the substrate. In a preferred embodiment the tear line is only molded into the substrate for 40%–80% of its thickness. More preferably, the tear line extends for 60%–70% of the thickness of the substrate. Most preferably, the tear line extends through about 65% of the thickness of the substrate.

In a preferred embodiment the tear line surrounds four sides of a cover. The tear line is preferably provided with a hinge on the side that is to be positioned vertically upwardly when installed in a vehicle. The hinge is preferably formed by attaching a fabric to the inner surface of the substrate with a portion spanning the tear line. The fabric thus provides a hinge such that the airbag cover does not become separate from the remainder of the instrument panel upon deployment of the airbag. In a most preferred embodiment of this invention, the fabric is formed to be secured to the airbag cover across the majority of the width of the airbag cover and to extend adjacent to a side opposed to the side of the tear line wherein the hinge is secured. A further portion of the fabric extends on the instrument panel inner face away from the upper tear line and the remainder of the airbag cover. Preferably, the fabric is a scrim material.

The tear line preferably includes a deep ditch portion which is relatively thin and extends into the substrate. An angled entry portion extends from the ditch portion and into the cover. The entry portion minimizes the likelihood that the airbag will become snagged as the airbag deploys. The angled entry portion is angled from one side of the ditch portion away from an opposed side and into the airbag cover to provide an unobstructive surface for an airbag to deploy. The opposed side extends from and generally perpendicular to the inner surface of the instrument panel.

Molding a deep grain, for example a Miller or Euro grain, to the outer (first) surface serves several purposes. The grain direction running parallel to the upper and lower tear strips creates a stress riser which enhances the break away of the airbag door from the main body of the panel.

In a second embodiment of this invention, the hinge is molded into the substrate, and the tear line does not extend through the uppermost side of the airbag cover. The molded hinge most preferably includes two generally curved portions with a first portion extending into the substrate and forming the hinge. The first portion is positioned laterally into the airbag cover from the second portion. The second portion preferably extends outwardly and away from the inner face of the instrument panel and provides reinforcement for the hinging action at the first portion.

These and other features of the present invention can be best understood from the following specification and drawings, of which the following is a brief description.

BRIEF DESCRIPTION OF THE DRAWINGS

FIG. 6 is a view along line 6—6 as shown in FIG. 5.

FIG. 7 shows another embodiment of the present invention.

FIG. 8 shows a cross-sectional view along line 8—8 as shown in FIG. 7.

FIG. 9 shows a detail of the preferred grain structure.

DETAILED DESCRIPTION OF A PREFERRED EMBODIMENT

Figure 1:
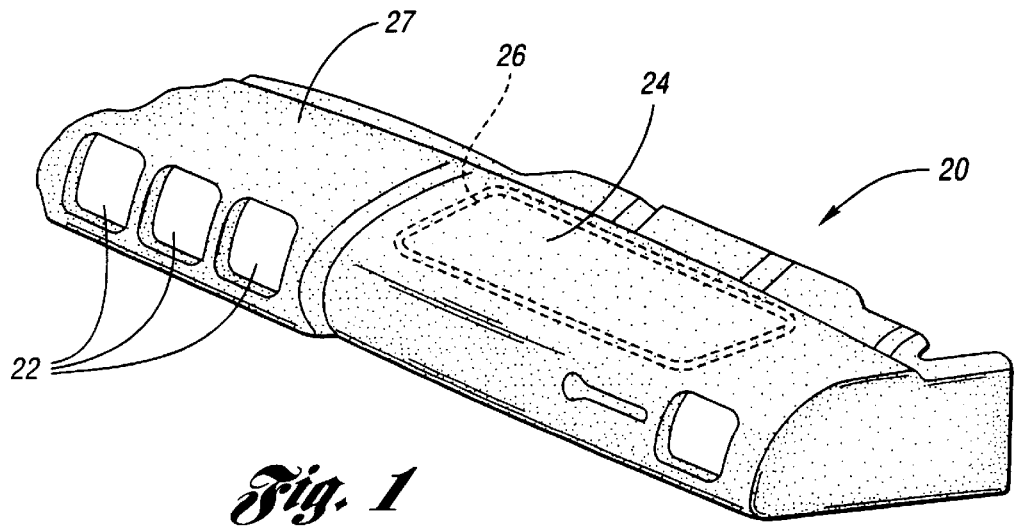
FIG. 1 shows an instrument panel incorporating the present invention.

FIG. 1 shows an instrument panel 20. As known, the instrument panel 20 incorporates a plurality of openings 22 through which various vehicle instruments will be mounted. An airbag cover 24 is defined by a tear strip 26 and is formed integrally with the remainder of the instrument panel. Tear strip 26 is shown as a dotted line in FIG. 1 since it does not extend to the outer surface 27. Outer surface 27 of the instrument panel 22 does not include any seams in the area of the airbag cover 24.

Figure 2:
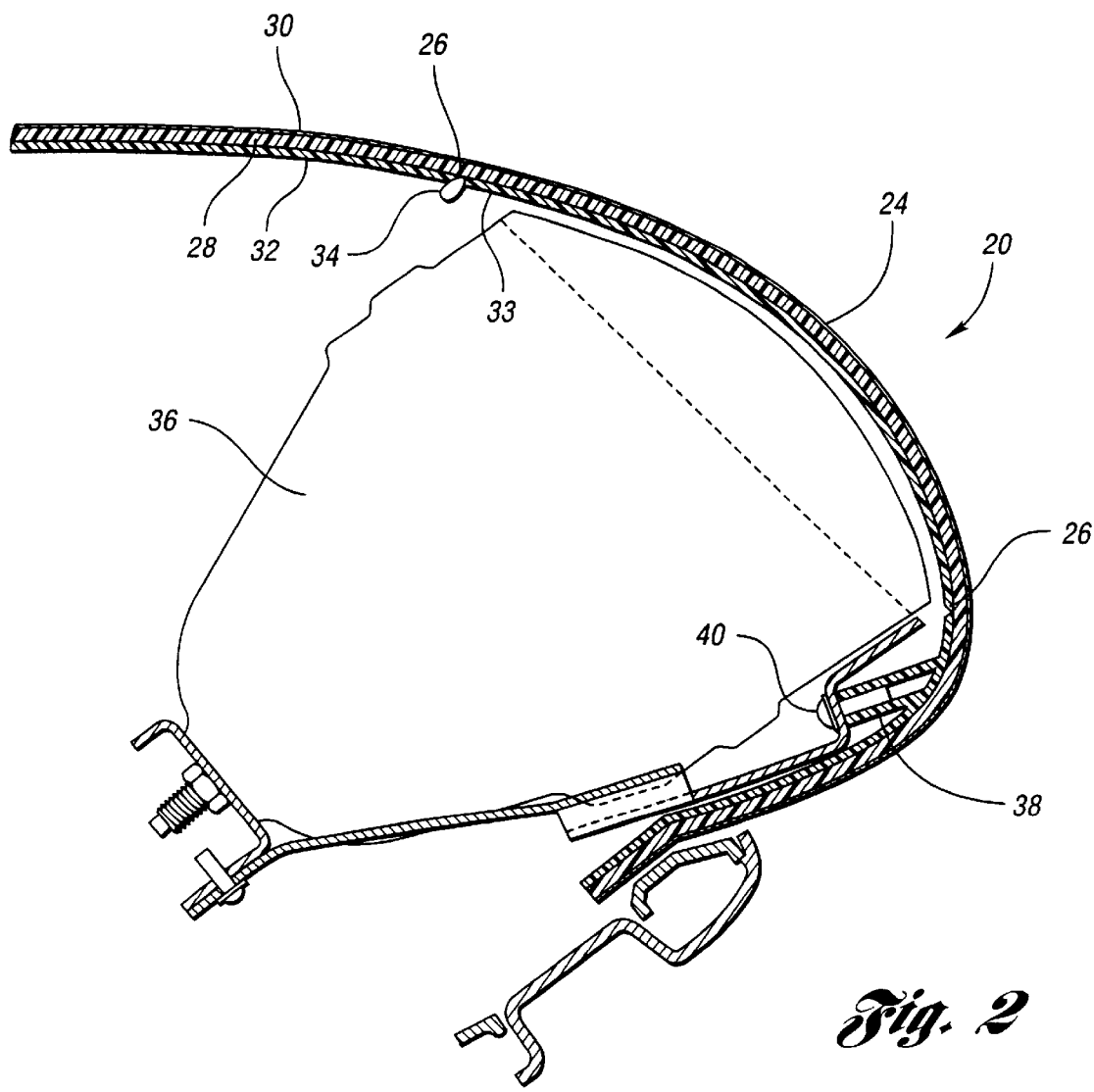
FIG. 2 is a cross-sectional view through an instrument panel and showing an airbag module being mounted within the instrument panel.

As shown in FIG. 2, the instrument panel 20 is formed of a foam layer 28 and an outer vinyl cladding 30. In practice, the foam and vinyl is preferably a foam backed vinyl attached as a unit to the substrate. An inner relatively rigid substrate 32 is mounted inwardly of the foam layer 28. Tear strip 26 preferably only extends through a portion of the substrate 32. A fabric hinge 33 is shown extending across an upper side of tear strip 26, and downwardly to a location adjacent a lower side of the tear strip 26. Preferably, fabric hinge 33 also extends to just inside of the side edges of the tear strip 26. As shown, a hinge portion 34 spans the upper side of tear strip 26. Upon deployment of the airbag module 36, the airbag cover 24 is torn outwardly from the remainder of the instrument panel. Hinge 33 ensures that the cover 24 will not be removed but instead pivots outwardly.

Since tear strip 26 does not extend into foam layer 28, the invention ensures an acceptable appearance without any seam at the outer surface 27. If the tear line 26 did extend into foam layer 28, it is possible that depressions could form in the outer surface 27, which would be unsightly and undesirable.

Substrate 32 may include a plurality of bosses 38, which form bores for receiving screws 40 to secure the airbag module 36 to the instrument panel 20. The mounting of the airbag module 36 is as known in the art, and forms no portion of this invention.

Figure 3:
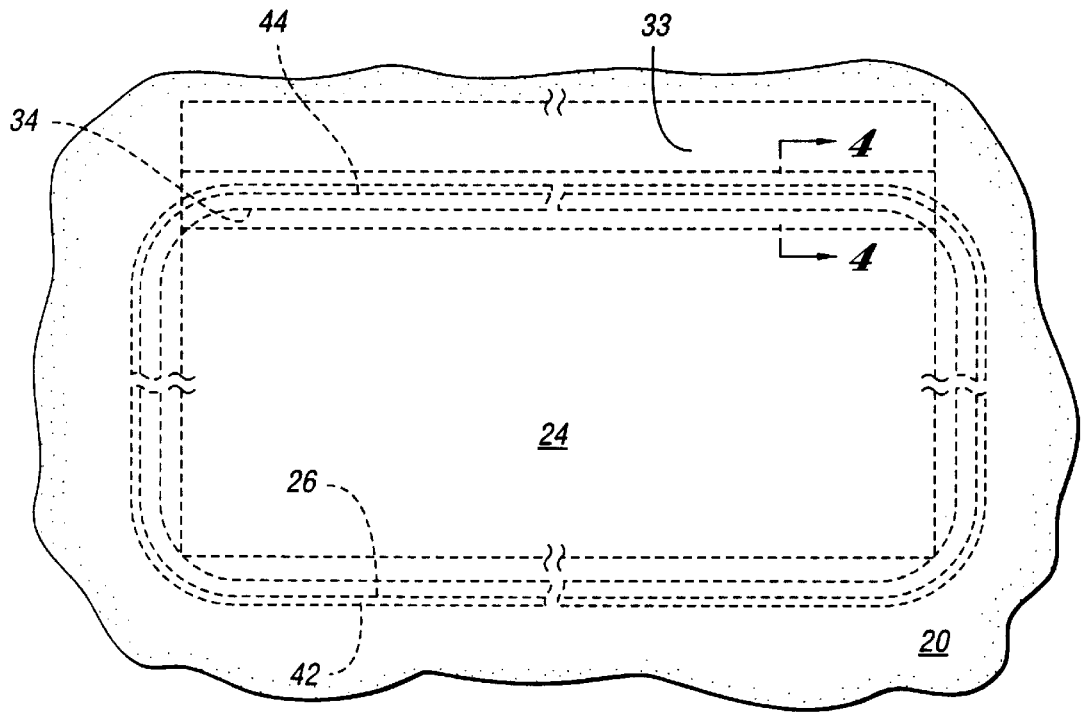
FIG. 3 is a plan view of a first embodiment of the present invention.

As shown in FIG. 3, airbag cover 24 has tear strip 26 defining four sides of the cover. As explained previously, fabric hinge 33 extends generally between the sides of the airbag cover 24 and portion 34 spans an upper side of tear strip 26.

Figure 4:
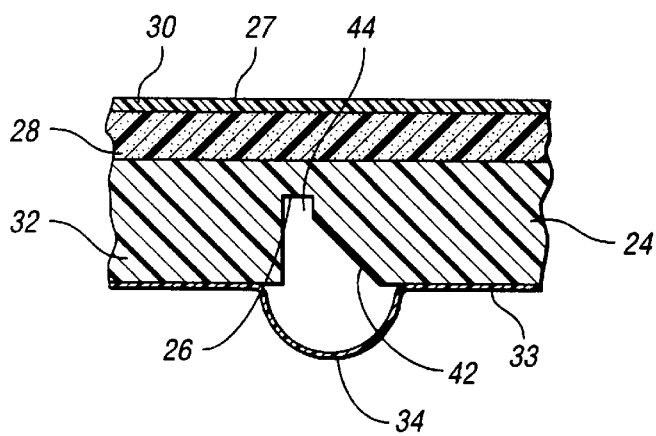
FIG. 4 is a cross-sectional view along line 4—4 as shown in FIG. 3.

As shown in FIG. 4, tear strip 26 includes a relatively deep ditch portion 44, and an angled entry portion 42 formed into substrate 32. Entry portion 42 extends into the remainder of the cover 24 from ditch portion 44. The angled entry portion 42 provides a surface that is unlikely to snag the airbag as it deploys. As is clear from FIG. 3, ditch portion 44 and entry portion 42 extend along the entire tear strip 26.

As shown, ditch portion 44 extends only partially into the substrate 32. Since ditch portion 44 does not reach the foam layer 28, outer surface 27 is less likely to include any resultant depressions, etc., which would be unsightly. Ditch portion 44 preferably extends through 40%–80% of the width of the substrate 32. In one embodiment the substrate has a thickness of approximately 3 millimeters and the foam layer has a thickness of approximately 2.25 millimeters. Ditch portion 44 more preferably extends into the substrate 32 for 60%–70% of its width, and most preferably for 65% of the width of substrate 32. In the above described embodiment, the ditch portion extended into the substrate by 1.95 millimeters, or 65% of the thickness. The angle of the entry surface 42 is preferably approximately 45°. In the above-discussed embodiment, the side-to-side thickness d (see FIG. 6) of the ditch portion is 0.6 millimeters. As shown, fabric 33 spans the tear strip 26 along the top side, with hinge portion 34 jutting outwardly across tear strip 26. Fabric 33 is relatively flexible, and thus will flex as the airbag cover 24 tears outwardly around the other three sides of the tear strip 26.

Figure 5:
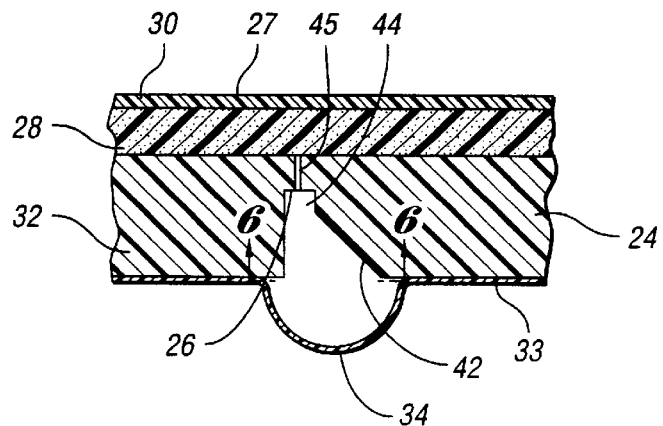
FIG. 5 shows a second embodiment similar to FIG. 4.

As shown in FIG. 5, in some applications it may be desirable to make cuts 45 into the tear strip ditch portion 44. This may be desirable, for example, in applications where there is a thicker foam, or a more resistant vinyl cover.

The cuts 45, as shown in FIG. 6, are spaced along ditch portion 44, and preferably around the entire tear strip 26. Uncut portions 46 are formed between adjacent cuts 45. Cuts 45 reduce the resistance to tearing when the airbag module deploys. Thus, cuts 45 assure there is acceptably low restriction to deployment of the airbag. Cuts 45 preferably extend for a thickness that is less then the side-to-side thickness d of ditch 44.

Cuts 45 preferably do not extend into the foam 28. Preferably, cuts 45 are formed by water jet cutting technology. Water jet cutting technology is available which is able to precisely control the cut, and thus, there is little difficulty in achieving this control. Preferably, the cutting occurs before the foam and vinyl are attached to the substrate. Preferably, uncut portions 46 extend for approximately 12.0–12.7 millimeters, and cuts 45 also extend for approximately the same length.

FIG. 7 shows a second embodiment cover 49. Second embodiment cover 49 has a tear strip 26 which only extends around three sides. The tear strip 26 still has ditch portion 44 and entry portion 42. As shown, tear strip 26 has ends 48 which merge into a hinge 50. An outer portion 52 of the hinge provides support for hinging action at hinge 50.

As shown in FIG. 8, the hinge 50 is a semi-circular portion extending into the substrate, while the outer portion 52 is semi-circular and extends outwardly of the substrate for a greater distance than the nominal thickness of a reinforcement portion 54 such as found in the remainder of the instrument panel adjacent hinge portion 52. When the airbag cover 49 begins to tear away along strip 26, reinforcement portion 54 ensures that the hinge 50 will result in cover 49 bending upwardly as shown at 56.

Preferably, fabric hinge 33 is formed of a scrim material. In one embodiment, the scrim was a vinyl coated polyester fabric having a 10×10 mesh and being 2600 denier polyester. The particular scrim is available from Phifer Wire Products, Inc. of Tuscaloosa, Ala., and available under their order number 225694-2. The foam layer 28 is preferably an expanded polyvinyl chloride. The substrate is preferably a relatively rigid plastic such as is now utilized for instrument panel substrates.

FIG. 9 shows a preferred grain pattern for the invention. Preferably, grains 60 extend generally parallel to the top and bottom sides of tear strip 26.

Preferably, the fabric hinge 33 is attached to the rear face of the substrate by an adhesive. In one embodiment, the adhesive used was available under the trade name Plexus™ from ITW Adhesives of Danvers, Mass. Plexus™ is generally a methacrylic adhesive. As best understood, this adhesive includes a methyl methacrylate, a methacrylic acid, a benzoyl peroxide, a butyl benzyl phthalate and an LMG chain alcohol carboxylic acid ester.

Preferred embodiments of this invention have been disclosed, however, a worker of ordinary skill in the art would recognize that certain modifications come within the scope of this invention.

What is claimed is:

1. A vehicle instrument panel comprising:
   an outer decorative surface and an inner surface, a tear strip defining at least three sides of an airbag cover in said inner surface, said outer surface including no seams associated with said tear strip; and
   said tear strip provided by a relatively deep ditch portion and an angled entry portion being angled from one side of said ditch portion away from an opposed side and into said airbag cover to provide an unobstructive surface for an airbag to deploy, said opposed side extending from and generally perpendicular to said inner surface of said instrument panel.

2. An instrument panel as recited in claim 1, wherein a fourth side of said airbag cover is provided as a hinge to secure said airbag cover when said airbag cover tears from the remainder of said instrument panel.

3. An instrument panel as recited in claim 2, wherein said hinge is provided by a fabric layer which spans said fourth side.

4. An instrument panel as recited in claim 3, wherein said fourth side is also provided with said tear strip, with said hinge spanning said fourth side of said airbag cover.

5. An instrument panel as recited in claim 2, wherein said hinge is molded into said inner surface of said instrument panel.

6. An instrument panel as recited in claim 5, wherein said molded hinge includes two adjacent generally curved portions, said hinge being provided by a first curved portion extending into said inner surface, and a second hinge reinforcement curved portion being provided extending outwardly of said inner surface adjacent to said first hinge portion to provide reinforcement for said first hinge portion to bend.

7. An instrument panel as recited in claim 1, wherein said instrument panel includes a substrate defining said inner surface, foam between said substrate and said outer surface, and a vinyl cover covering said foam and defining said outer decorative surface, said tear strip extending through 40%–80% of the thickness of said substrate, and not extending into said foam.

\* \* \* \* \*